3,851,033
METHOD OF FORMING REINFORCED FLAT
SHEET BY EXTRUSION OF A TUBE, SLIT-
TING AND OPENING TUBE TO A FLAT
SHAPE WHILE SUPPORTING SAME
Nino Madonini, Milan, Italy, assignor to Industrie
Pirelli S.p.A., Milan, Italy
Filed Dec. 14, 1972, Ser. No. 314,984
Claims priority, application Italy, Dec. 17, 1971,
32,525/71; Netherlands, Nov. 7, 1972, 7215039
Int. Cl. B29d 7/16
U.S. Cl. 264—146                              3 Claims

ABSTRACT OF THE DISCLOSURE

A method for making flat strips of wire reinforced elastomeric material free from compressive stresses from split extruded tubes comprises a means for supporting the tube wall as it passes from a circular to flat cross-section, said means having contour changes along its length to prevent the wires from exerting compression on the rubber comprised between them.

---

This invention relates generally to reinforced elastomeric or the like elongated bands or belts and more particularly to a method and apparatus for making conveyor belts, drive belts and the like.

The apparatus provided by the invention may be used with machines adapted to extrude a continuous length of elastomeric tubing having circumferentially spaced longitudinally extending wires embedded therein, continuously split the tube longitudinally along one of its generatrices and flatten the tube into a continuous strip.

The production of elastomeric bands or strips suitable for use as conveyor belts or the like on such machines has many advantages. For example, the tube can be extruded at a high rate of speed with reduced production cost. Moreover, the wires may be embedded in the elastomeric material at exactly the desired depth, exactly parallel to each other in accurately spaced relationship and under equal tension. The cost of the equipment required for making conveyor belts by such a method is also less than that required for other methods of making wire reinforced conveyor belts.

Wire reinforced bands produced on tube extruding machines have the disadvantage, however, that relatively thin walled tubing or tubing having a diameter which is great with respect to the thickness of the wall frequently collapse as they pass from a tubular to a flat shape.

Such a collapse occurs because the tube wall bends along some lines as a result of the tension of the wire as it passes from tubular form to a flat band. Therefore, sections of the strip do not appear as continuous and regular curves but as a series of arc which intersect at sharp corners or bends as illustrated in FIG. 2.

These corners disappear as the tube becomes flat but the pitch of the cord is altered, the tension on the cord varies from cord to cord and the resulting band is not of uniform thickness. Such phenomenon is most apparent with thin bands or with bands in which the ratio of width to thickness is great. Increasing the thickness of the band decreases the chances of collapse and the band in cross-section does not have spaced sharp kinks between arcs but it is an undulated cross-section. It is believed that even though relatively thick tubes do not collapse, the elastomeric material thereof becomes stressed and the resulting strips have the same disadvantages as the thinner strips but to a lesser extent.

It is therefore an object of the invention to provide an apparatus and method for making wire reinforced elastomeric strips which are substantially uniform in thickness and have substantially constant physical characteristics along their cross-section regardless of the relative width and thickness thereof. Still another object of the invention is to provide a method for making an elongated band or strip of wire reinforced belting material which is substantially flat and has uniform physical characteristics.

Other objects will become apparent from the following description with reference to the accompanying drawing wherein.

Figure 8:
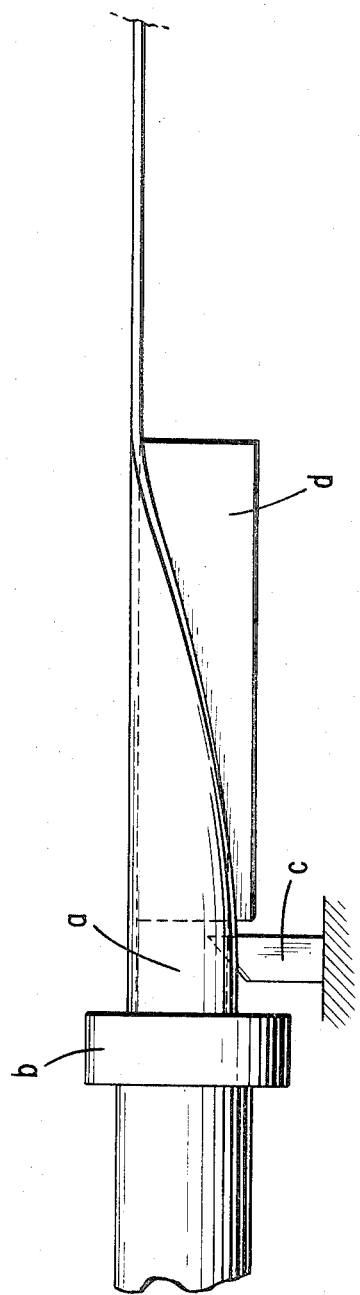
FIG. 8 represents diagrammatically, in their relative positions, the devices for producing a flat band by extrusion, starting from a tube reinforced with longitudinal wires.

The foregoing objects and others are accomplished in accordance with this invention, generally speaking, by providing a means for maintaining circumferentially spaced, longitudinally extending reinforcing wires embedded in an extruded elastomeric tube at a constant distance from one another as the walls of the tube are flattened after the tube has been longitudinally split along one of its generatrices. More specifically, as referred to in FIG. 8, an elastomeric tube $a$ having reinforcing wires extending longitudinally therethrough is fabricated by an extrusion head $b$ adapted to incorporate the wires in the wall of the tube as it is extruded. Means, like a blade $c$, are provided for cutting or splitting the tube longitudinally between two of the wires along one of its generatrices. The tube wall is then flattened into a band while maintaining the reinforcing wires at a constant spaced relationship by means $d$ according to the present invention.

Figure 1:
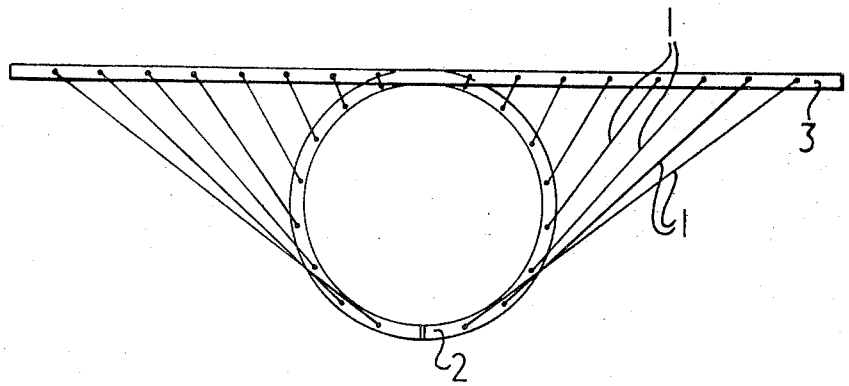
FIG. 1 illustrates diagrammatically the theoretical track followed by spaced longitudinally extending wires as they pass from tubular to flat form without elastomeric material thereabout, to retrain them.

Referring now to FIG. 1, said figure illustrates a theoretical situation. A series of wires 1 which are not embedded in an elastomeric material or, in other words, are not restrained in their movement will follow the rectilinear tracks shown in FIG. 1 as they pass from a tubular form 2 to a flat form 3. Two adjacent wires 1 are not parallel to each other during the changeover from tubular to flat form. On the contrary they follow the oblique lines shown in FIG. 1. Hence, the distance or spacing between two adjacent wires varies continuously during the changeover from tubular to flat form. This is true of all wires and occurs in various ways depending upon the position of the adjacent wires in the tube wall and the relative position between the tubular form and the flat form. Since two adjacent wires lie on oblique lines, the distance between the wires at first decreases to a minimum and then increases.

Figure 3:
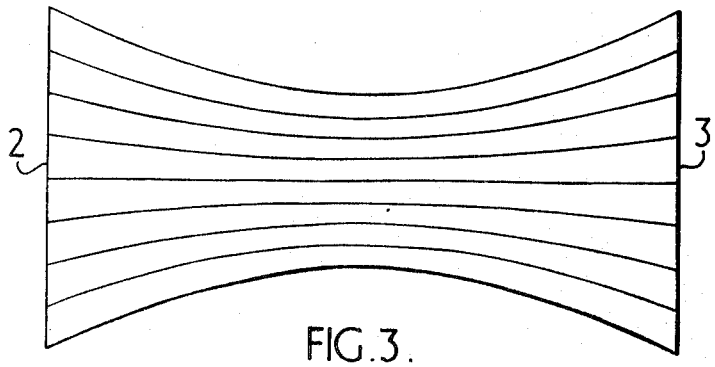
FIG. 3 shows the plane development of the surface of FIG. 1; i.e. it shows the outline of the distance which would occur between the wires during the changeover from tubular to flat form if the wires were not restrained by an elastomeric material.

The outline of the distance between adjacent wires, when not restrained by elastomeric material, is clearly shown in FIG. 3. FIG. 3 is obtained by rectifying the cross-sections of the group of wires of FIG. 1 in the changeover from tubular to flat form, i.e. by developing on one plane the lines corresponding to the cross-sections of FIG. 1.

By examining the outline of the distance between two adjacent wires in FIG. 3 it is seen that the maximum spacing between the wires occurs in the tubular form and the flat form where such distances are equal. In all the other positions the distance between two adjacent wires is smaller.

However, the theoretical case illustrated in FIG. 1 does not correspond to practice. In an extruded tube, the wires 1 are embedded in an elastomeric material and the latter prevents variation of distance between adjacent wires as the tube is flattened.

Such elastomeric material, opposing to a decrease in the distance between two adjacent wires, becomes subject to compressive stress.

By examining the outline of the distance between adjacent wires shown in FIG. 3 it is seen that the elastomeric material in the changeover from tubular to flat form is always subject to compression and that such compressive stress at first increases and then decreases.

Figure 4:
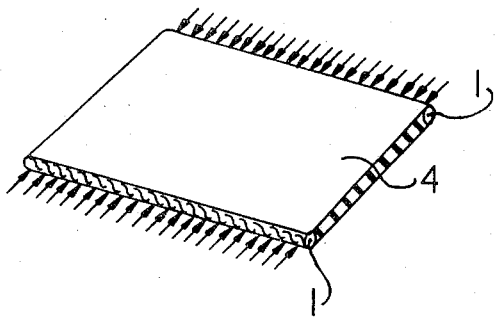
FIG. 4 is a perspective view of a section of an extruded strip between two longitudinally extending reinforcing wires illustrating the stresses to which the elastomeric material is subjected during change-over from tubular to flat form.

FIG. 4 shows a portion of elastomeric material, comprised between two adjacent wires, which has been submitted to compressive stress by changeover from tubular to flat form.

As is known, a sheet of elastomeric material is not capable of resisting compressive stresses exerted in a direction perpendicular to its thickness, both when the sheet of material is uncured or vulcanised.

When the sheet of elastomeric material is vulcanised and is subjected to compressive stress, it collapses, but when the stress is released it recovers its flat form without permanent deformations.

If, however, the portion of elastomeric material is uncured and is subject to compressive stress, it collapses and on release of the stress a part of the deformation is permanent.

The elastomeric material 4 which embeds the wires in the changeover from the tubular form 2 to the flat form 3 is uncured and is at a relatively high temperature as the production of the tubular part is made by extrusion.

Such elastomeric material has therefore a relatively low viscosity.

It follows that the elastomeric material is still more sensitive to compressive stress and is not capable of resisting it well.

Figure 2:
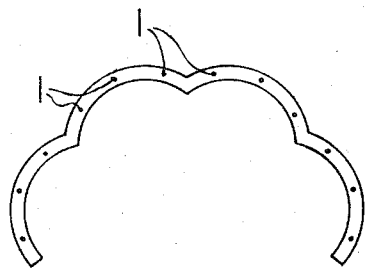
FIG. 2 illustrates diagrammatically in cross-section the effect of collapse during passage from tubular to flat form.

Consequently, in the portions where the elastomeric material is stressed beyond a certain limit, depending on the thickness of the elastomeric material in relation to the width of the band to be produced and to the relative position between the tubular form and the flat form, it collapses, giving rise to undulations, as shown in FIG. 2.

Once the band is flattened, after having assumed the conformation shown in FIG. 2, there are variations in the thickness of the band, variation in the pitch of the cords and a variation in tension from cord to cord, even if the wires are perfectly centered in the wall of the band and are exactly parallel with one another.

It is therefore important to avoid such irregular compression conditions.

The present invention solves the problem by making the wires maintain a practically constant mutual distance during the flattening process.

More precisely, the present invention provides means for imposing such condition to the wires as the extruded product changes from tubular form to flat form. In an embodiment of the invention, this means is constituted by a support surface for the extruded material on which the material leans during the changeover from tubular to flat form.

Figure 5:
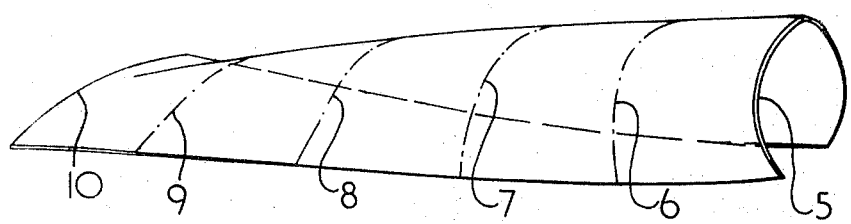
FIG. 5 illustrates in perspective view the surface of a support for the extruded product in the changeover from tubular to flat form.
Figure 6:
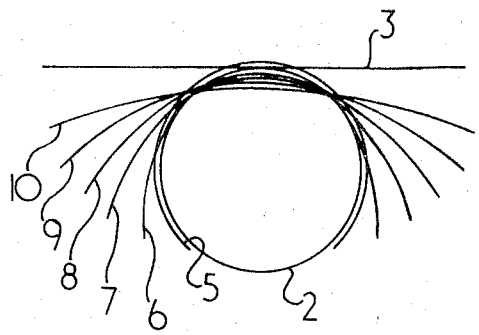
FIG. 6 shows the shape of the sections of the surface of support for the extruded product in the changeover from tubular to flat form.

An embodiment of the support surface is shown in FIG. 5. To illustrate more clearly the form of this supporting surface, FIG. 6 shows the cross-sections of the supporting surface taken at constant distances from one another. The line marked with reference number 5 represents the profile of the cross-section of the supporting surface in proximity of the extrusion orifice for the tubular product.

The line marked with reference number 10 represents the section farthest from the extrusion orifice for the tubular product. The intermediate sections are marked with reference numbers in ascending order from line 5 to line 10, where the lowest reference numbers refer to the sections nearest to the extrusion orifice for the tubular product.

The lines of FIG. 6 represented by numbers 2 and 3 define respectively the position of the tubular form and that of the flat form. In the form of support shown, line 3 is parallel to the tangent to line 2 at the point of the highest level of the latter, but this is not meant in a limitative sense, the object being to illustrate one particular embodiment. Lines 2 and 3 can assume, each with regard to the other, different positions, obviously giving rise to different forms for the support, even if, once the relative position between lines 2 and 3 is fixed, the form of the support is only one.

Anyhow, as is seen in FIG. 6, such a supporting surface for the product during the changeover from tubular form to flat form shows cross-sections consisting of open arcs of regular curves whose bending radius increases progressively from one section to the other, changing from the value of the radius of the tubular form to an almost infinite value.

Such a supporting surface can be determined either by calculation or by experiment.

Figure 7:
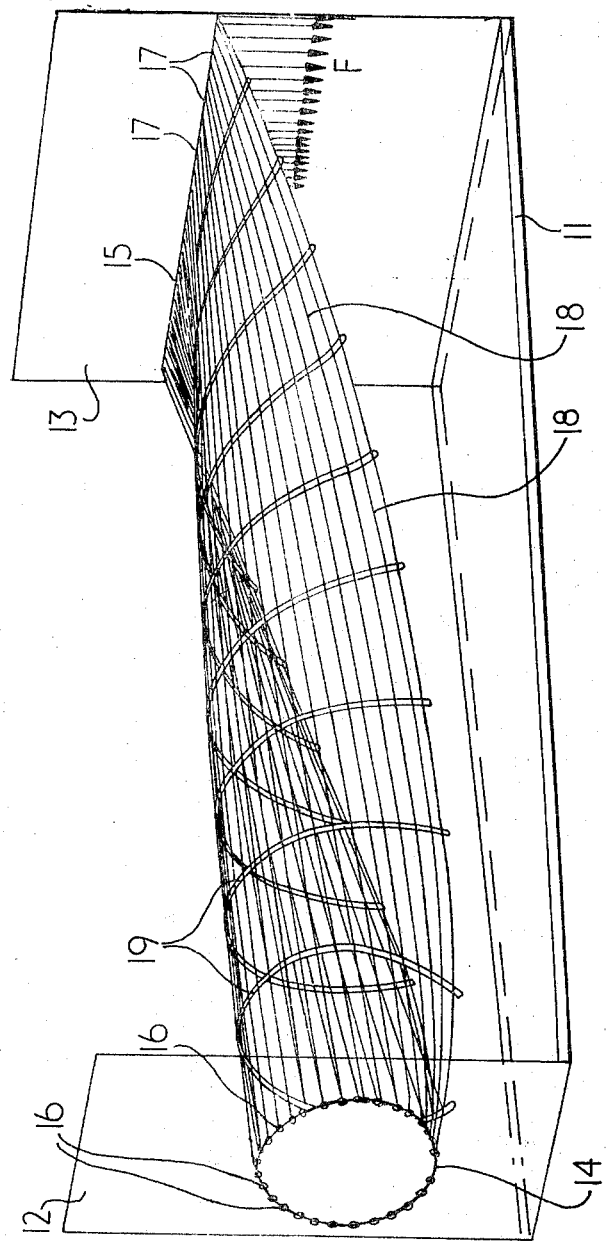
FIG. 7 represents in perspective view a model which defines the contour of the support for the extruded product in the changeover from tubular to flat form.

The experimental determination of the supporting surface described above can be effected with the model shown in FIG. 7.

As can be seen from FIG. 7, two brackets 12 and 13 arise vertically from a base 11.

On bracket 12 a circle 14 is drawn which corresponds to the circle which contains the axis of the cords in the extruded tubular element.

On bracket 13 is drawn a line 15 (segment of a straight line), parallel to the base.

Straight line 15, in addition to being parallel with base 11, is also parallel to the tangent to circle 14 at the highest point thereof. As an example only, the straight line 15 and the tangent to circle 14, at the latter's highest point, have the same level from the base.

On circle 14, drawn on bracket 12, equidistant holes 16 are obtained in a number equal to that of the wires contained in the tubular element. The distance between two adjacent holes 16 on circle 14 is the same as the distance between two adjacent wires of the tubular element.

Analogously, on bracket 13, at the straight line 15, holes 17 are made in equal number to the holes 16 and to the wires embedded in the flat portion.

The distance between two adjacent holes 17 is equal to the distance measured on the arc of circumference comprised between two adjacent holes 16. At each hole 16, the end of a wire 18 is fixed and the other end of the wires 18 passes within holes 17 to be connected to a weight, not shown, which applies to said wires a force F, equal for each wire.

Each hole 16 of the bracket 12 has a corresponding hole 17 on bracket 13 and such relation is determined by the relation existing between the wires which reinforce the tubular element and those which reinforce the flat element.

The wires 18 passing from holes 16 to holes 17 are connected transversally to one another by flexure springs 19 which enable the adjacent wires to remain constantly equidistant.

These flexure springs lie in planes parallel to those which contain brackets 12 and 13.

The connection between wires 18 and flexure springs 19 is carried out in any conventional way, e.g. by soldered eyelets which allow the wires to run freely within such eyelets. The flexure springs 19 are open elements and their ends are attached to the two wires 18 corresponding to the wires which in the band produced are the nearest to the generatrix at which the tubular element is cut, lying on opposite sides of this cut.

The springs 19 impart localised stresses on the wires, which tend to carry the wires on a plane. The wires 18 contrast the action of the flexure springs 19 since they are subjected to tension stresses which are imparted to them by the weights previously mentioned. Under the action of these stresses, the group of wires is arranged along an equilibrium surface, whose form is determined by the elastic constants of the flexure springs 19 and by the tension stresses of the wires.

By varying the elastic constants of the flexure springs 19 and the tension of the wires, several surfaces are obtained.

Among the surfaces, the one suitable for constituting a supporting surface for the extruded element in its changeover from the tubular form to the flat form, is the surface which is obtained when the stresses in the wires make negligible the actions that the flexure springs 19 carry out on them.

Such a surface is obtained experimentally by increasing the stresses on the wires, i.e. by increasing the weight applied to them until the latter exceeds such a value that any further increase of its weight does not originate a considerable variation in the arrangement of the wires.

In these conditions, springs 19 function without practically imparting any stress to the wires to which they are connected.

The model thus constructed is of use in the case in which the flat form is at the same level of the tangent at the highest point of the tubular form.

In the case in which the relative positions between the tubular form and the flat form are different, the construction of the model is carried out with the same modalities and the result will be a model of different form.

It is then possible, by deteceting in any way the levels at various points of the model, to construct a rigid, e.g. metallic surface to be used by a support in the changeover from the tubular to the flat form.

The supporting surface is preferably a continuous surface, but nothing prevents it from being discontinuous provided that the envelope is the conitnuous surface defined in the manner previously indicated.

Moreover, to facilitate the flow of the extruded product in its changeover from the tubular form to the flat form on such a supporting surface, this can be provided with freely rotatable rollers or balls.

The presence of the supporting surface, compelling the single wires to follow a particular track, prevents the elastomeric material from being subject to compressive stresses and therefore avoids the phenomenon of the collapse.

The danger of the collapse having thus been prevented and having eliminated the compressive stresses of the elastomeric material forming the band, there are no more alterations in the pitch of the cords, the tension in these is constant and the same for all the cords, and there is a uniformity of thickness in the produced band.

Although a preferred embodiment of the present invention has been described and illustrated, variations can be made by those skilled in the art without departing from the spirit and scope of the invention except as it may be limited by the claims.

What is claimed is:

1. A method of making a substantially flat, wire-reinforced elastomeric strip which comprises extruding an uncured elastomeric tube having circumferentially spaced wires which extend longitudinally therethrough with areas of uncured elastomeric material therebetween, splitting the tube longitudinally through one of said areas as it is extruded, and flattening the resulting slit tube into a flat reinforced strip while supporting it at substantially all points as it passes from its circular cross-section to a flat band on a surface having a configuration both transversely and longitudinally which conforms substantially with the configuration of the tube wall as it bends from its circular cross-section into a flat band thereby preventing collapse of the elastomeric portions between the wires with the formation of undulations in the tube, whereby the resulting flat, wire-reinforced elastomeric strip is substantially free from compressive stresses and undulations between the wires.

2. The method of claim 1 wherein the configuration of the supporting surface has been determined by securing at one end a plurality of wires equal in number to the number of wires embedded in the wall of the extruded tube with the said ends being circumferentially spaced to form a circle, said spacnig corresponding to the spacing of the wires in the tube wall, supporting the wires a distance spaced from said ends equal to the distance to be traveled by an extruded tube as it is unfolded from its circular cross-section into a substantially flat band, said wires being supported along a line which lies in the same plane as a line drawn tangent to the upper surface of the said circle, placing a plurality of open ended flexure springs over the resulting assembly of wires at longitudinally spaced points between the said ends of the wires and the point where they are supported, securing the springs to the said wires at cross-over points, weighting the said wires at a point beyond the said point of support until additional weight does not materially change the arrangement of the wires, and using the resulting model as a pattern for forming the surface on which said slit tube is supported.

3. The method of cliam 2 wherein flexure springs are arcuate shaped and of progressively increasing radius at spaced points between the circular and the straight line ends of the wires.

References Cited
UNITED STATES PATENTS

| | | | |
|---|---|---|---|
| 1,435,659 | 11/1922 | Roberts | 264—146 |
| 3,303,251 | 2/1967 | Heider et al. | 425—114 X |
| 3,090,991 | 5/1963 | Hathaway | 264—146 X |
| 3,426,111 | 2/1969 | Simpson | 264—95 X |

JAN H. SILBAUGH, Primary Examiner

W. E. HOAG, Assistant Examiner

U.S. Cl. X.R.
264—174

UNITED STATES PATENT OFFICE
CERTIFICATE OF CORRECTION

PATENT NO. : 3,851,033
DATED : November 26, 1974
INVENTOR(S) : NINO MADONINI

It is certified that error appears in the above-identified patent and that said Letters Patent are hereby corrected as shown below:

Column 1, line 54, change "a series of arc" to read --- a series of arcs ---.

Column 5, line 47, change "detceting" to --- detecting ---.

Column 5, line 53, change "conitnuous" to --- continuous ---.

Column 6, Claim 2, line 6, change "spacnig" to --- spacing ---.

Column 6, Claim 3, line 1, change "cliam" to --- claim ---.

Signed and sealed this 3rd day of June 1975.

(SEAL)
Attest:

RUTH C. MASON
Attesting Officer

C. MARSHALL DANN
Commissioner of Patents
and Trademarks